US011227457B2

(12) United States Patent
Patel

(10) Patent No.: US 11,227,457 B2
(45) Date of Patent: Jan. 18, 2022

(54) BLOCKCHAIN MANAGED STORAGE

(71) Applicant: International Business Machines Corporation, Armonk, NY (US)

(72) Inventor: Neelakant R. Patel, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 15/829,883

(22) Filed: Dec. 2, 2017

(65) Prior Publication Data

US 2019/0172282 A1 Jun. 6, 2019

(51) Int. Cl.

| | |
|---|---|
| ***G07C 9/00*** | (2020.01) |
| ***G07C 9/27*** | (2020.01) |
| ***H04L 9/06*** | (2006.01) |
| ***H04L 9/32*** | (2006.01) |

(52) U.S. Cl.

CPC .............. *G07C 9/27* (2020.01); *H04L 9/0637* (2013.01); *H04L 9/3239* (2013.01); *H04L 9/3247* (2013.01); *H04L 2209/38* (2013.01)

(58) Field of Classification Search

CPC .. G07C 9/00103; H04L 9/0637; H04L 9/3247

See application file for complete search history.

(56) References Cited

U.S. PATENT DOCUMENTS 9,667,427 B2 5/2017 Oberhauser et al.
2009/0221267 A1* 9/2009 Bender ................ H04W 48/14 455/412.2
2011/0219230 A1* 9/2011 Oberheide ............. H04L 9/321 713/168
2012/0166818 A1* 6/2012 Orsini .................. H04L 9/3231 713/193
2017/0149560 A1 5/2017 Shah
2017/0155515 A1 6/2017 Androulaki et al.
2018/0191714 A1* 7/2018 Jentzsch .............. H04L 63/126
2018/0314809 A1* 11/2018 Mintz .................. H04L 9/3236
2019/0116024 A1* 4/2019 Wright .................. H04L 9/0643
2019/0130086 A1* 5/2019 Tovey .................. H04L 9/3247

FOREIGN PATENT DOCUMENTS

WO 2017080578 A1 5/2017

OTHER PUBLICATIONS

Sachin et al., "Blockchains Consensus Protocols in the Wild." arXiv preprint arXiv:1707.01873 (2017). (BACKGROUND).

(Continued)

*Primary Examiner* — Lynn D Feild
*Assistant Examiner* — Jessica J South

(57) ABSTRACT

An example operation may include one or more of receiving a request to open a storage system, the request comprising an identification of a user that submitted the request, transmitting a notification to one or more stakeholder devices of the storage system indicating the user requests access to the storage system, receiving responses from the one or more stakeholder devices, determining, via a smart contract executing on a blockchain node associated with the storage system, whether to open the storage system based on the received responses and consensus information included in the smart contract, and storing the determination made by the smart contract as a transaction in a blockchain.

17 Claims, 5 Drawing Sheets

300

320

| Sl. No | Expectations | Expectations met Yes / No | If No, reason given |
|---|---|---|---|
| 1 | Current GPS location corresponds to such and such latitude and longitude within a set tolerance level. | Yes | |
| 2 | Container is being opened by a customs officer of certain rank | Yes | |
| 3 | Sender of the consignment agrees to opening the container | Yes | |
| 4 | Is Regular Inspection the reason for opening? | No | Order from Higher authorities |
| | | | |

Smart Contract

310

Blockchain Node

(56) References Cited

OTHER PUBLICATIONS

Azaria et al. “Medrec: Using blockchain for medical data access and permission management.” Open and Big Data (OBD), International Conference on. IEEE, 2016. (BACKGROUND).
Shrier et al., Blockchain & infrastructure (identity, data security). Tech. rep. URL: http://cdn. resources. getsmarter.ac/wp-content/uploads/2016/05/MIT_Blockchain_Infrastructure_Report_Part_Three_May_2016. pdf, 2016. (BACKGROUND).

* cited by examiner 100
110
STORAGE SYSTEM
120
BLOCKCHAIN NODE
130
STAKEHOLDER
131
STAKEHOLDER
132
STAKEHOLDER

| SL No | Expectations | Expecíations met Yes / No | If No, reason given |
| --- | --- | --- | --- |
| 1 | Current GPS location corresponds to such and such latitude and longitude within a set tolerance level. | Yes | |
| 2 | Container is being opened by a customs officer of certain rank | Yes | |
| 3 | Sender of the consignment agrees to opening the container | Yes | |
| 4 | Is Regular Inspection the reason for opening? | No | Order from higher authorities |
| | | | |

Smart Contract

310

Blockchain Node

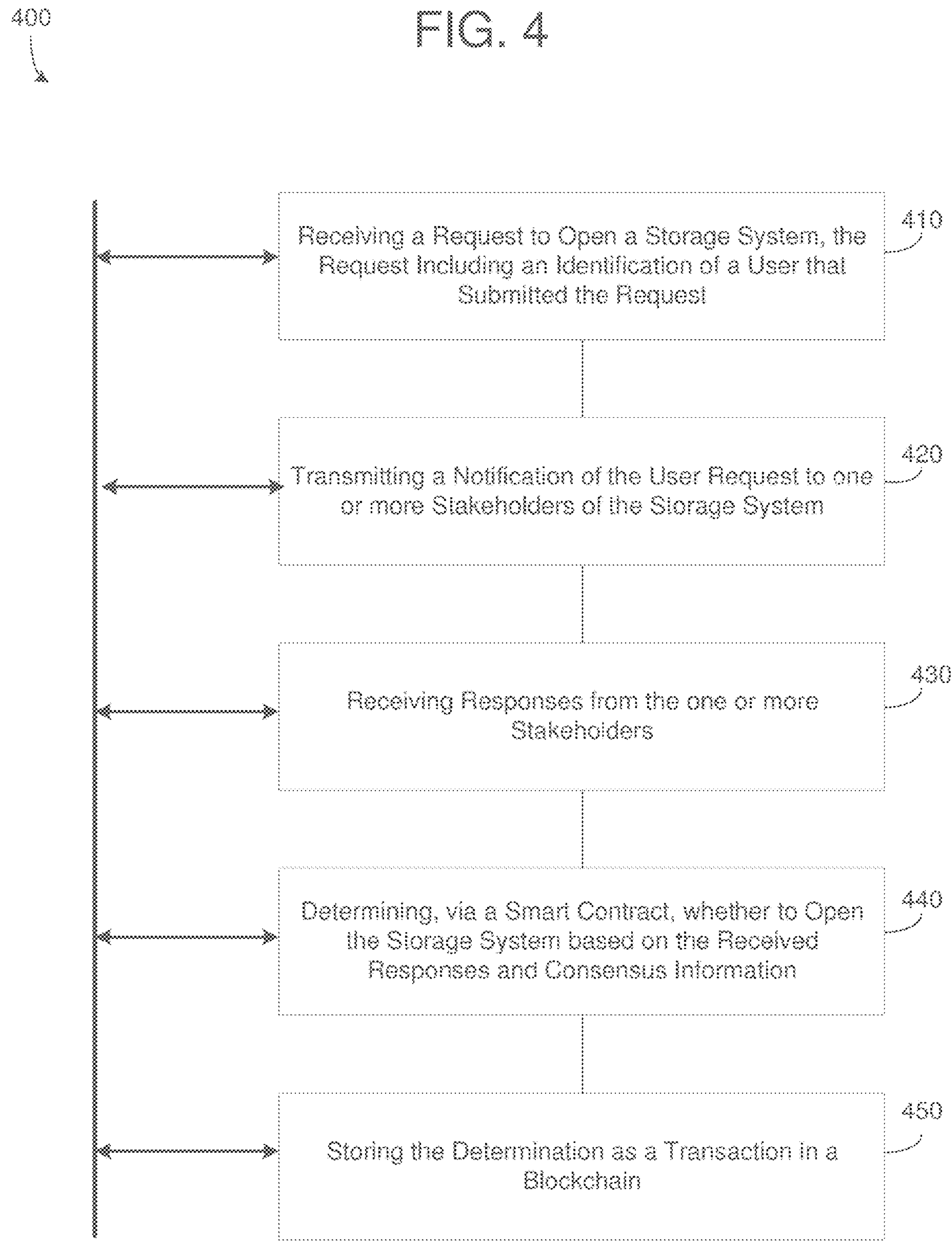
400
FIG. 4
Receiving a Request to Open a Storage System, the Request Including an Identification of a User that Submitted the Request
410
Transmitting a Notification of the User Request to one or more Stakeholders of the Storage System
420
Receiving Responses from the one or more Stakeholders
430
Determining, via a Smart Contract, whether to Open the Storage System based on the Received Responses and Consensus Information
440
Storing the Determination as a Transaction in a Blockchain
450

500
COMPUTER SYSTEM/SERVER 502
RAM
510
Storage
System
514
CACHE
512
MEMORY
506
516
518
PROCESSING
UNIT
504
NETWORK
ADAPTER
526
I/O INTERFACES
524
DISPLAY
522
EXTERNAL
DEVICES
520

BLOCKCHAIN MANAGED STORAGE

TECHNICAL FIELD

This application generally relates to blockchain transactions, and more particularly, to blockchain managed storage.

BACKGROUND

Storage facilities such as safes and other systems such as freight containers, self-storage, garages, and the like, are often used to store valuables and other items that an owner or a lessee may need but may not have room for or feels more secure storing in a locked and secured storage area. However, one of the difficulties with storage facilities is regulating access to such a system especially when the owner or lessee is not present. For example, friends, family members, workers, and others may have legitimate reasons for accessing the storage facility. In this case, the owner or the lessee may not be comfortable divulging a key, passcode, etc. for opening the storage facility. As another example, the owner or the lessee may have a biometric requirement for opening the storage and may not want to provide access to any additional users. Accordingly, what is needed is a secure way of enabling a person to remotely control secure access to a storage facility when the person in control of the storage is not present.

Meanwhile, a blockchain may be used as a public ledger to store information such as digital assets and the like. Because any individual or entity can often provide information to a blockchain, this information should be reviewed and confirmed. This operation is known as consensus. There are two types of consensus centralized and decentralized. Centralized consensus includes one central database that is used to rule transaction validity. A decentralized consensus transfers authority and trust to a decentralized network and enables its nodes to continuously and sequentially record their transactions on a public "block", creating a unique "chain" referred to as a blockchain. Cryptography, via hash codes, is used with a blockchain to secure an authentication of a transaction source and removes the need for a central intermediary.

SUMMARY

In one example embodiment, provided is a method that includes one or more of receiving a request to open a storage system, the request including identification information of a user who submitted the request, transmitting a notification to one or more stakeholder devices of the storage system indicating the user requests access to the storage system, receiving responses from the one or more stakeholder devices, determining, via a smart contract executing on a blockchain node associated with the storage system, whether to open the storage system based on the received responses and consensus information included in the smart contract, and storing the determination made by the smart contract as a transaction in a blockchain.

In another example embodiment, provided is a computing system that includes one or more of a processor to receive a request to open a storage system, the request including identification of a user that submitted the request, and a network interface to transmit a notification to one or more stakeholder devices of the storage system indicating the user requests access to the storage system, and receive responses from the one or more stakeholder devices. In this embodiment, the processor may further execute a smart contract associated with the storage system to determine whether to open the storage system based on the received responses and consensus information included in the smart contract, and store the determination as a transaction in a blockchain.

A non-transitory computer readable medium having stored therein program instructions that when executed cause a computer to perform one or more of receiving a request to open a storage system, the request comprising identification information of a user who submitted the request, transmitting a notification to one or more stakeholder devices of the storage system indicating the user requests access to the storage system, receiving responses from the one or more stakeholder devices, determining, via a smart contract executing on a blockchain node associated with the storage system, whether to open the storage system based on the received responses and consensus information included in the smart contract, and storing the determination made by the smart contract as a transaction in a blockchain.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

FIG. 3 is a diagram illustrating an example of a consensus algorithm process for a blockchain enabled storage system in accordance with an example embodiment.

FIG. 4 is a diagram illustrating a method of a blockchain managing access to a storage system in accordance with an example embodiment.

DETAILED DESCRIPTION

Figure 1:
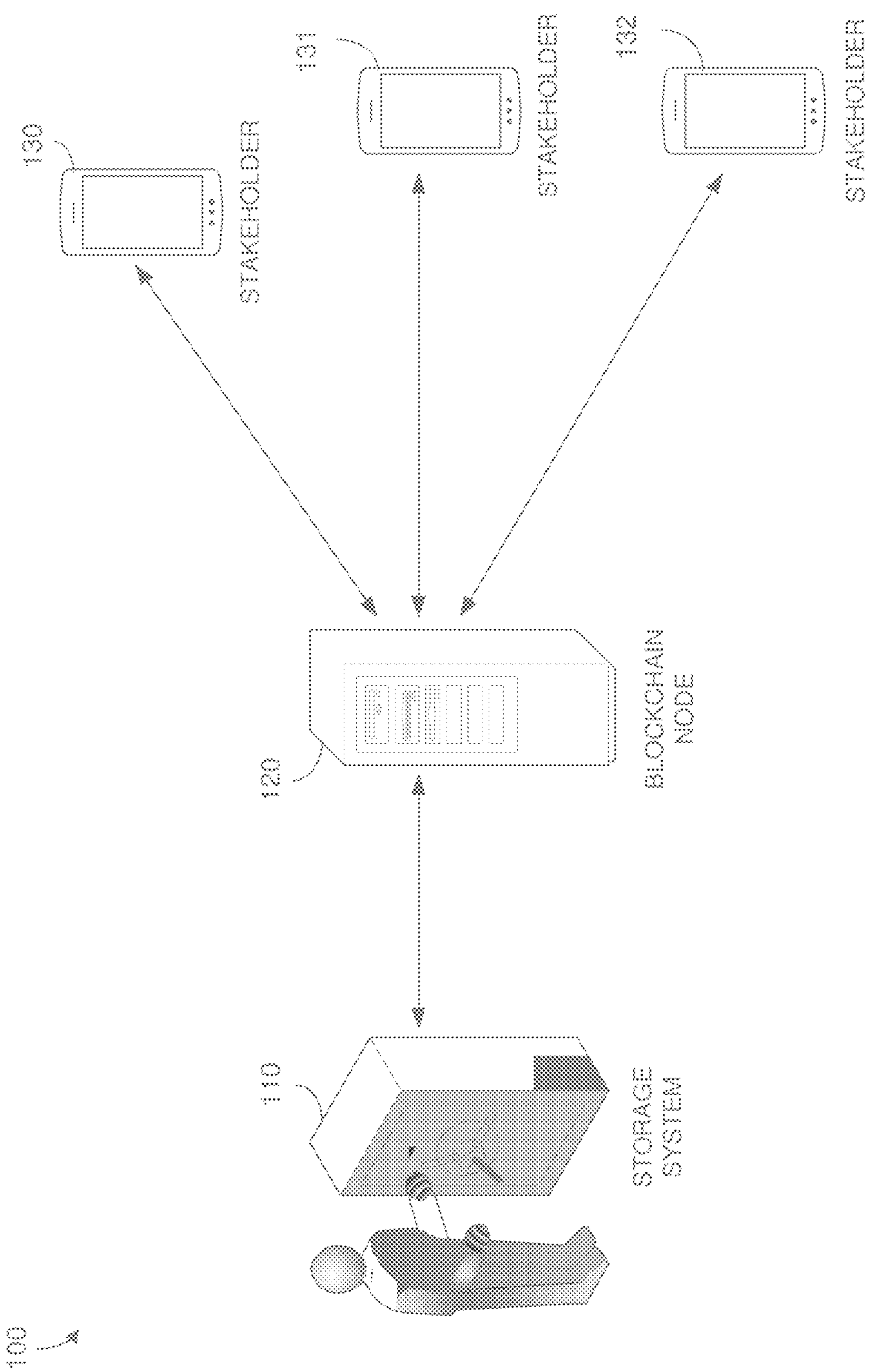
FIG. 1 is a diagram illustrating a blockchain system managing a storage system in accordance with an example embodiment.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application in one embodiment relates to blockchain transactions, and in another embodiment relates to a blockchain network for managing access to a storage system such as a safe, a garage, a storage facility, or the like, based on a smart contract executing one or more consensus algorithms. Through the use of blockchain technology, the example embodiments improve safety in using a safe (or other storage system) and provide flexibility to multiple parties in handling the storage system. The storage system may be accessible to multiple users (referred to as stakeholders) who each have joint access and control over the contents and or use of the storage system. One example, is multiple tenants to a common storage container. Prior to opening the storage system, a blockchain node herein may authenticate the user who is attempting to gain access to the storage system. In addition, before the blockchain node opens the storage, the blockchain node (e.g., via the storage system) may request the user to provide a reason (audio, video, text, etc.) for opening the storage. Information about the reason for opening the storage system may be transmitted by the blockchain node to registered devices of other stakeholders, who in-turn send in their approval or disapproval to the blockchain node.

The storage system may not be opened by the blockchain node until a consensus is reached by the stakeholders. The consensus, in the context of opening the storage system, can be decided by one or more consensus algorithms or other consensus parameters included in the smart contract executing on the blockchain node. The consensus information may depend on who is authorizing access to the storage system, a role a person voting is playing among the stakeholders, a role of the person requesting access to the storage system, etc. The blockchain node may wait for a predetermined amount of time to collect the consensus vote from the stakeholders and if the time is exceeded, it may force the user requesting access to the storage system to get the consensus vote again. The blockchain node may only open the storage system when a successful consensus is reached. In addition, information about who is wishing to open the safe, the reason given to the stakeholders, the success or failure of the consensus vote, the time of all the related events, and the like, may be recorded in a blockchain which is accessible to the blockchain node. The blockchain may be analyzed and audited by the stakeholders at a later time allowing stakeholders to see records of who had access, who gave approval, and the reason given for wanting access.

The blockchain node may be incorporated within the storage system (e.g., within a safe, storage container, etc.) and may execute a smart contract agreed upon by the stakeholders for determining whether to allow access to the storage system. The smart contract can enforce a consensus that is based on a date or time of the access, a geographic location (e.g., GPS coordinates of the user) wishing to open the storage system, the duration for which the storage system should be open, and who the blockchain node should alert upon the various events. Geographic location based smart contracts can particularly prove useful with storage systems such as freight containers on ships and trains. For geographic location based operations, the storage system or container may be equipped with GPS devices. In closed locations where GPS signals are not available, blockchain node may depend on mobile signals.

The storage system may also include an auxiliary stored power, stored safely, to handle a situation of power failure. For example, in the case of a power failure the blockchain node may enforce multiple levels of authentication and also switch the methods of communication with stakeholders through which it can handle power failure better, for example sending text messages in a particular format to other systems, which in turn update the blockchain registries. The use of a blockchain with storage systems may be extended to other devices which effectively work like the door of a safe or storage container, for example a container on the high seas, the front door of a house or office, and the like, which can be accessed by various stakeholders like the owners of the house, the housekeeping staff, a cook, a repair staff, and the like.

FIG. 1 illustrates a blockchain system 100 managing a storage system in accordance with an example embodiment. Referring to FIG. 1, the system 100 includes a storage system 110 which may include a safe, a container, a front door, or any other desired storage system in which access is prevented by means of a locking mechanism. Here, the locking mechanism may be a gate, a keypad, a dial, or the like. Coupled to or otherwise electrically connected to the storage system 110 is a blockchain node 120 which may be part of a larger blockchain network (not shown). The blockchain node 120 stores and manages a blockchain which maintains a ledger of transactions identifying opening events associated with the storage system 110. In various embodiments, the storage system 110 and the blockchain node 120 are implemented as a single entity or they may be separate entities that are connected to each other via a network such as the Internet, or via a cable. The system 100 further includes one or more stakeholder devices 130, 131, and 132 which represent stakeholders of the storage system 110. Here, a stakeholder may refer to a person that owns or otherwise manages access to the storage system 110 (e.g., lessee, joint-tenant, co-owner, etc.). In one non-limiting example, a copy of the blockchain may be managed by a blockchain node 120 that is within the storage system 110 (e.g., safe, freight container, front door, etc.) to be close to the source of action and store the most accurate information. The blockchain can synchronize/replicate with the other nodes on the network with which the other stakeholders refer The blockchain managed by the blockchain node 120 may include a smart contract executing on the blockchain node 120 and which is in control of determining when to open the storage system 110. In operation, a user may attempt to access storage system 110 in-person, for example, by submitting or otherwise inputting commands on a keypad, making a motion to a camera, speaking into a microphone, etc. to equipment/devices associated with the storage system 110. Here, the storage system 110 may capture information of the user such as a biometric authentication (e.g., iris, fingerprint, voice, facial scan, etc.), a passcode, an identity of the user, and the like. The storage system 110 may also capture additional information such as a reason the user desires access to the storage system 110 along with a timestamp at when the request is received.

In response to receiving the request, the storage system 110 or a computer systems associated therewith (e.g., the blockchain node 120, or another device) transmits the request to registered stakeholder devices 130, 131, and 132 seeking approval/disapproval for opening the storage system 110. The stakeholders may provide responses via the stakeholder devices 130, 131, and 132 which are received by the blockchain node 120 and analyzed by the smart contract. The storage system 110 use a variety of strategies to connect to stakeholder devices 130-132, be it through a mobile data network, email, a mobile application, short message service (SMS), voice call, and the like. In some cases, the storage system 110 may use more than one means to connect to stakeholders. As another example, the user may request access to the storage system 110 ahead of time (and not in-person). For example, the user may send a text message, email, phone call, use a mobile application, or the like, to provide a request which is received by the blockchain node 120 and which triggers the consensus determination.

The smart contract executing on the blockchain node 120 may determine whether or not to open the safe based on the responses received from the stakeholders 130, 131, and/or 132, and based on consensus information included in the smart contract. The consensus information may include a simple yes/no response based system or it may include different algorithms or other parameters for determining a consensus. For example, the smart contract may be able to determine whether to open the storage system 110 in a situation in which one or more stakeholders do not respond. Here, one or more predetermined stakeholders may dictate whether the storage system 110 is opened when not all stakeholders response as one non-limiting example. As another example, the smart contract may be setup with very strict consensus parameters which can enforce a requirement that the consensus come from all stakeholders or it may be less strict and only require a quorum or even a single stakeholder to respond.

The smart contract may enforce any other consensus constraints such as GPS coordinates of the user making the request in comparison to GPS coordinates of the storage system 110 which may be included in the smart contract. Here, the GPS coordinates must be within predetermined distance from each other as defined by the smart contract. This example can be useful for containers on the high seas or trains. The smart contract may give certain stakeholders more consensus weight in the consensus determination based on the role of each stakeholder with respect to each other as well as the role of the user requesting access to the storage system 110. For example, the smart contract may conclude that if approval from a particular stakeholder is received the approval from other stakeholders may not count, though there could be multitude of stakeholders. As another example, the smart contract may be more flexible in allowing access, provided enough information is supplied to establish reasonably well who and why the storage system 110 is being accessed. For example, a user may provide a reason why they are requesting access to the storage system 110. Also, the storage system 110 may provide means to send information/notifications to stakeholders by way of SMS service or email services (such as the reason provided by the requester) which can help in gathering the consensus as per the requirements of the smart contract. The consensus information gathered from the requester and from the stakeholders may be used to generate and fill-in a lookup table which the smart contract may analyze to determine whether to open the storage system 110.

In response to receiving the requests from the stakeholder devices 130, 131, and 132, the smart contract executing on the blockchain node 120 determines whether a consensus has been reached and determines whether to open the storage system 110 based on the consensus. In some embodiments, the smart contract may also trigger the storage system 110 to open based on the consensus being determined as a yes. The smart contract may store information about the request and each step of the request as it goes from the user request to the consensus determination. The information may be stored as a transaction in the blockchain and may include an identification of the requester, a reasons for the request, the responses from the stakeholders, the consensus algorithm used to make the determination, timestamps of each stage of the process, and the like. This information stored in the blockchain can be queried by stakeholders at a later time. In some embodiments, the smart contract may determine that a predetermined time limit has been reached prior to receiving responses from enough of the stakeholder devices 130, 131, and 132 to perform a consensus, and terminate the request to open the storage system based on the predetermined time limit being exceeded. This may require the user to submit the request again.

Figure 2:
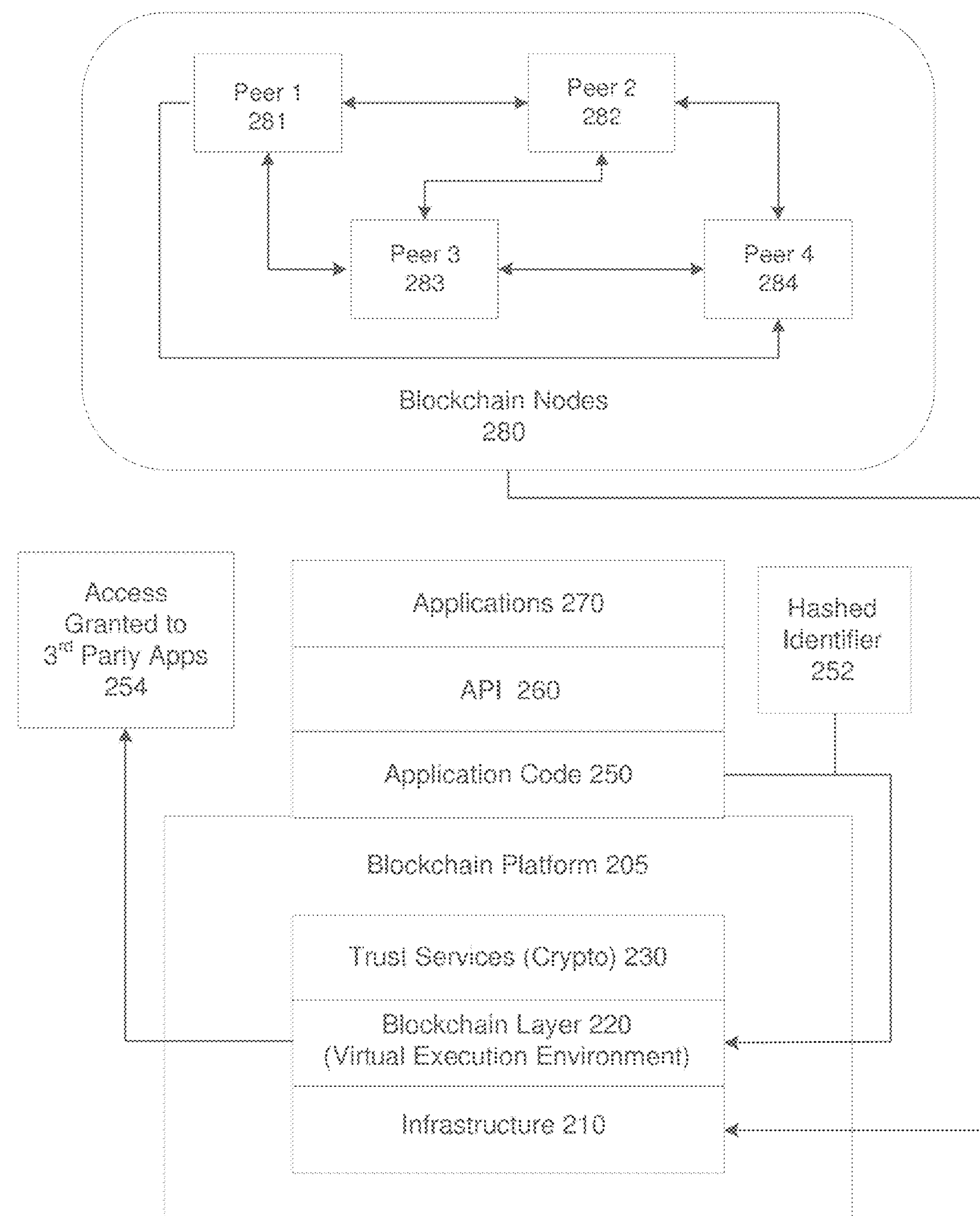
FIG. 2 is a diagram illustrating a blockchain system configuration in accordance with an example embodiment.

FIG. 2 illustrates a blockchain system database configuration, according to example embodiments. Referring to FIG. 2, blockchain system 200 may include certain common blockchain elements, for example, a group 280 of assigned peer blockchain nodes 281-284 which participate in blockchain transaction addition and validation process (consensus). As an example, the blockchain node 120 shown in FIG. 1 may be any of the peer blockchain nodes 281-284, etc. Any of the blockchain peer nodes 280 may initiate a blockchain authentication and seek to write to a blockchain immutable ledger stored in blockchain layer 220, a copy of which may also be stored on the underpinning physical infrastructure 210. In this configuration, the customized blockchain configuration may include one or applications 270 which are linked to application programming interfaces (APIs) 260 to access and execute stored program/application code (e.g., chain code and/or smart contracts) 250, which are created according to the customized configuration sought by the participants and can maintain their own state, control its own assets, and receive external information. This code can be deployed as a transaction and installed, via appending to the distributed ledger, on all blockchain peer nodes.

The blockchain base or platform 205 may include various layers of blockchain data, services (e.g., cryptographic trust services, virtual execution environment), and underpinning physical computer infrastructure necessary to receive and store new transactions and provide access to auditors which are seeking to access data entries. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain configuration of FIG. 2 may process and execute program/application code 250 by way of one or more interfaces exposed, and services provided, by blockchain platform 205. The code may control blockchain assets. For example, the code can store and transfer data, and may be executed by the blockchain in the form of a smart contract and associated chain code with conditions or other code elements subject to its execution. The smart contracts 250 may be created to execute reminders, updates, and/or other notifications subject to the changes, updates, etc. As another example, the smart contracts 250 can be used to trigger the opening of a storage system, determine a consensus from stakeholders, and the like. The smart contracts 250 can themselves be used to identify rules associated with authorization and access requirements and usage of a storage system. A hashed identifier information 252 received from a user device may be processed by one or more processing entities (virtual machines) included in the blockchain layer 220. The result may include access being granted 254 to a third party application from the blockchain computing environment (VM). In this example, the previously known user identifiers or data template information may be stored in the blockchain platform 205. The physical machines 210 may be accessed to retrieve the user device template and the information can be used to match against incoming user identifiers for verification purposes.

Within chaincode, a smart contract may be created via a high-level application and programming language, then converted to a string that is written to a block in the blockchain. The smart contract may be invoked by a user device submitted operation or by a broker agent. The smart contract may write data to the blockchain in the format of key-value pairs. Furthermore, the smart contract code can read the values stored in a blockchain and use them in application operations. The smart contract code can write the output of various logic operations into the blockchain such as a request for opening a storage, results of a consensus of the request, the consensus algorithm used, and the like. The code may be used to create a temporary data structure in a virtual machine or other computing platform. Data written to the blockchain can be public or can be encrypted and maintained as private or it may be made public or restricted to stakeholder access. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

FIG. 3 illustrates an example of a consensus algorithm process 300 for a blockchain enabled storage system in accordance with an example embodiment. In this example, the consensus algorithm process 300 generates and fills-in a lookup table 320. A consensus algorithm included in a smart contract executing on a blockchain node 310 may work by filling in the truth table 320. The truth table 320 may include a variety of expectations of the smart contract along with a Yes or a No which indicates whether that expectation is met or not by the requester and/or the stakeholder responses. The final decision to open the safe or not is dependent on the smart contract, which says which combination of expectations must have a 'Yes' for the storage system to be opened.

In the example of FIG. 3, the truth table 320 corresponds to a truth table for opening a freight container, remotely. The smart contract fills-in the truth table based on the user request, the responses received from the stakeholder, additional details gathered from the user device, and the like. In this case, even though the last expectation in the truth table 320 is not met, the smart contract may dictate that the container should still open because there is an order from the higher authority to check the contents of the container. As another example, if the smart contract were more strict and required a Yes for all expectations to open the container irrespective of the circumstance, the smart contract would not open container. Also, the container may not be opened by the smart contract if a GPS location is not that of the destination even if a customs officer or other authority has instructions to open the container.

FIG. 4 illustrates a method 400 of a blockchain managing access to a storage system in accordance with an example embodiment. For example, the method 400 may be performed by a blockchain node which may include or be coupled to a computing system such as a server, a cloud platform, a workstation computer, a user device, and the like. In 410, the method includes receiving a request to open a storage system. Here, the request may include identification information of a user who submitted the request. The request may be submitted on a keypad or a input pad of a storage locker, safe, container, freight container, lock, or the like. As another example, the request may be transmitted from a mobile device to computing system coupled to the storage system and capable of controlling the opening and/or locking of the storage system. The identification information may include a name, a phone number, a code, a keyword, a key, an authentication such as a biometric scan (e.g., iris, fingerprint, facial recognition, etc.) and the like. In some embodiments, the storage system may authenticate the user when receiving the request. However, in some embodiments, the storage system does not authenticate the user.

In 420, the method includes transmitting a notification to one or more stakeholders of the storage system indicating the user requests access to the storage system. For example, the request may be transmitted by the storage system or a computing device associated therewith to one or more stakeholder devices via a network such as the Internet private network, and/or the like. In one example, the storage system may transmit the notification to a mobile device of each stakeholder. In response, the storage system (or the computing system associated therewith) may receive response from the one or more stakeholder devices, in 430. Here, the responses may include a yes, no, or request for additional information. The responses may also identify the stakeholder including their role with respect to the storage system. Examples of roles include tenant, joint-tenant, owner, co-owner, renter, lessee, and the like. In some embodiments, the request to open the storage system may include a description of a reason provided by the user (e.g., voice, text, video, etc.) for opening the storage system, and the notification transmitted to the one or more stakeholders includes the reason for opening the storage system provided by the user.

In 440, the method includes determining, via a smart contract executing on a blockchain node associated with the storage system, whether to open the storage system based on the received responses and consensus information included in the smart contract. The smart contract may include logic configured to execute a transaction and store the executed transaction in a blockchain. In 450, the method includes storing the determination made by the smart contract as a transaction in a blockchain. Although not shown in FIG. 4, in some embodiments the method further includes triggering the storage system to open in response to the smart contract determining to open the storage system based on the received responses.

In some embodiments, the determining may include identifying a role of the user requesting to open the storage system and a role of each stakeholder that provided a response, and determining, by the smart contract, whether to open the storage system based on the identified roles. In some embodiments, the consensus information included in the smart contract may include predetermined geographical information associated with the storage system (e.g., geographical latitude and longitude components of a location of the storage system), and the determining may include determining whether to open the storage system based on geographical information of the user included in the request (e.g., geographical coordinates of a user device) and the predetermined geographical information stored in the smart contract.

The smart contract may be configured with logic that includes consensus information associated with the opening of the storage system and various requirements that must be met for the storage system to be opened. For example, the consensus information included in the smart contract may include one or more methods of determining a consensus when at least one but not all stakeholders respond. In some embodiments, the consensus information included in the smart contract may include a truth table, and the method further comprises filling in, by the smart contract, the truth table based on the request and the one or more received responses, and determining, whether to open the storage system based on the filled-in truth table.

In some embodiments, the method may further may include determining, by the smart contract, that a predetermined time limit has been reached prior to receiving responses from the one or more stakeholders, and terminating the request to open the storage system based on the predetermined time limit being exceeded. As another example, the storing in 450 may further include storing an identification of the user that requested access to the storage system, a reason for opening the storage system, the responses received from the one or more stakeholders, and the consensus information used to determine whether to open the storage system, in the blockchain transaction.

The above embodiments may be implemented in hardware, in a computer program executed by a processor, in firmware, or in a combination. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
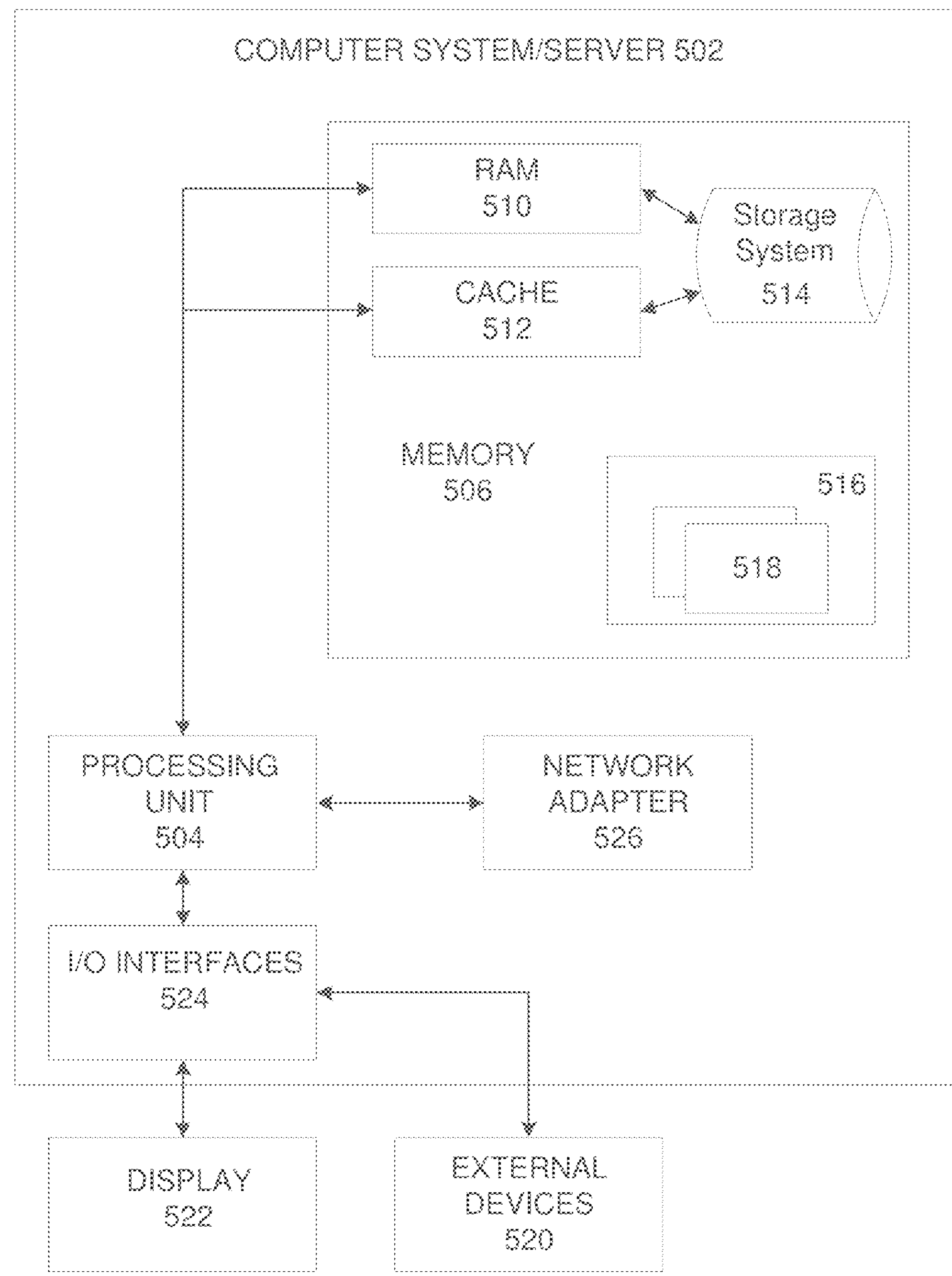
FIG. 5 is a diagram illustrating a blockchain computing system for managing access to a storage system in accordance with an example embodiment.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc. The computer system 500 may be a single device or a combination of devices. For example, the computer system 500 may be a blockchain node, a database, a server, a cloud platform, a network, a combination thereof, and the like.

FIG. 5 is not intended to suggest any limitation as to the scope of use or functionality of embodiments of the application described herein. Regardless, the computing system 500 (or node 500) is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in computing node 500 is shown in the form of a general-purpose computing device. The components of computer system/server 502 may include, but are not limited to, one or more processors or processing units 504 (i.e., processors), a system memory 506, and a bus that couples various system components including system memory 506 to processor 504. The computing node 500 may be the blockchain node 120 shown in FIG. 1 or another device or combination of devices such as a server, cloud platform, database, and/or the like. Also, the computing node 500 may perform each of the method 400 shown in FIG. 4.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526 (also referred to as a network interface). As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

According to various embodiments, the processor 504 may receive a request to open a storage system. For example, the request may include identification of a user that submitted the request. The request may be received from a mobile device connected to the computing system 500 or via a keypad that is embedded within the computing system 500 or coupled to the computing system 500 via a network, a cable, and/or the like. The network interface 526 may transmit a notification to one or more stakeholder devices of the storage system indicating the user requests access to the storage system, and receive responses from the one or more stakeholder devices. The processor 504 may further execute a smart contract associated with the storage system to determine whether to open the storage system based on the received responses and consensus information included in the smart contract, and store the determination as a transaction in a blockchain which may be included in the memory 506 or in a memory/storage coupled to or connected to the computing system 500.

The smart contract may be stored within the memory 506 and may be executed by the processor 504. In some embodiments, the processor 504 may trigger the storage system to open in response to the smart contract determining to open the storage system based on the received responses. For example, the processor 504 may open a safe, a lock, a door, a gate, and/or the like, in response to the smart contract determination. In some embodiments, the processor 504 may further store an identification of the user that requested access to the storage system, a reason for opening the storage system, the responses received from the one or more stakeholder devices, and the consensus information used to determine whether to open the storage system, in the blockchain transaction.

In some embodiments, the processor 504 may receive or otherwise identify a role of the user requesting to open the storage system and a role of each stakeholder that provided a response, and determine, by the smart contract, whether to open the storage system based on the identified roles. In some embodiments, the consensus information included in the smart contract may include predetermined geographical information associated with the storage system, and the processor 504 may determine whether to open the storage system based on geographical information of the user included in the request and the predetermined geographical information stored in the smart contract. In some embodiments, the consensus information included in the smart contract may include one or more methods of determining a consensus when at least one but not all stakeholders respond.

In some embodiments, the consensus information included in the smart contract may include a truth table, and the processor 504 may fill in, via the smart contract, the truth table based on the request and the one or more received responses, and determine, whether to open the storage system based on the filled-in truth table. As another example, the processor 504 may determine, via the smart contract, that a predetermined time limit has been reached prior to receiving responses from the one or more stakeholder devices, and terminate the request to open the storage system based on the predetermined time limit being exceeded.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. A blockchain processing method, comprising:

receiving a request to open a storage system, the request comprising identification information of a user who submitted the request;

transmitting a notification to one or more stakeholder devices of the storage system indicating the user requests access to the storage system;

receiving responses from enough of the one or more stakeholder devices to satisfy a consensus;

determining, via a smart contract running on a blockchain node that is communicatively coupled to the storage system, a plurality of expectations that are to be met before the storage system is to be opened;

identifying at least one expectation among the plurality of expectations that is not met and a reason why the expectation is not met;

triggering, via the smart contract on the blockchain node communicatively coupled to the storage system, opening of a door of the storage system based on the reason why the expectation is not met and a consensus algorithm stored in the smart contract; and storing information about the determination as a transaction on a blockchain ledger.

2. The blockchain processing method of claim 1, wherein the triggering comprises opening, via the blockchain node communicatively coupled to the storage system, a locking mechanism of the door of the storage system via the blockchain node communicatively coupled thereto, in response to a request from the smart contract.

3. The blockchain processing method of claim 1, wherein the request to open the storage system further comprises a description of a reason provided by the user for opening the storage system, and the notification transmitted to the one or more stakeholder devices includes the reason for opening the storage system provided by the user.

4. The blockchain processing method of claim 1, wherein the determining comprises identifying a role of the user requesting to open the storage system and a role of each stakeholder that provided a response, and determining, by the smart contract, whether to open the storage system based on the identified roles.

5. The blockchain processing method of claim 1, wherein the smart contract comprises one or more consensus algorithms for determining that the consensus has been reached when at least one but not all stakeholders respond.

6. The blockchain processing method of claim 1, wherein the smart contract further determines to grant access to the storage system based on one or more of a GPS location of the user, a reason for opening the storage given by the user, and a role of the user.

7. The blockchain processing method of claim 1, wherein the storing further comprises storing an identification of the user that requested access to the storage system, a reason for opening the storage system, the responses received from the one or more stakeholder devices, and consensus information used to determine whether to open the storage system, in the blockchain transaction.

8. The blockchain processing method of claim 1, wherein the storage system comprises at least one of a safe, a storage container, a building, and a garage, and the blockchain node is coupled to a door of the storage system.

9. A blockchain computing system comprising:

a processor configured to receive a request to open a storage system that is communicatively coupled to the blockchain computing system, the request comprising identification of a user that submitted the request; and a network interface configured to transmit a notification to one or more stakeholder devices of the storage system indicating the user requests access to the storage system, and receive responses from the one or more stakeholder devices;

wherein the processor is further configured to determine that enough responses have been received from the one or more stakeholder devices to satisfy a consensus, determine, via a smart contract running on the blockchain computing system, a plurality of expectations that are to be met before the storage system is to be opened, identify at least one expectation among the plurality of expectations that is not met and a reason why the expectation is not met, trigger, via the smart contract, opening of a door of the storage system based on the reason why the expectation is not met and a consensus algorithm stored in the smart contract, and store information about the determination as a transaction on a blockchain ledger.

10. The blockchain computing system of claim 9, wherein the processor is further configured to open a locking mechanism of the door of the storage system coupled thereto, in response to a request from the smart contract.

11. The blockchain computing system of claim 9, wherein the request to open the storage system further comprises a description of a reason for opening the storage system provided by the user, and the notification transmitted to the one or more stakeholder devices includes the reasons for opening the storage system provided by the user.

12. The blockchain computing system of claim 9, wherein the processor is further configured to identify a role of the user requesting to open the storage system and a role of each stakeholder that provided a response, and determine, by the smart contract, whether to open the storage system based on the identified roles.

13. The blockchain computing system of claim 9, wherein the smart contract comprises one or more consensus algorithms for determining that the consensus has been reached when at least one but not all stakeholders respond.

14. The blockchain computing system of claim 9, wherein the processor is further configured to determine to grant access to the storage system based on one or more of a GPS location of the user, a reason for opening the storage given by the user, and a role of the user.

15. The blockchain computing system of claim 9, wherein the processor is configured to store an identification of the user that requested access to the storage system, a reason for opening the storage system, the responses received from the one or more stakeholder devices, and consensus information used to determine whether to open the storage system, in the blockchain transaction.

16. A non-transitory computer readable medium having stored therein program instructions that when executed cause a computer to perform a method comprising:

receiving a request to open a storage system, the request comprising identification information of a user who submitted the request;

transmitting a notification to one or more stakeholder devices of the storage system indicating the user requests access to the storage system;

receiving responses from enough of the one or more stakeholder devices to satisfy a consensus;

determining, via a smart contract running on a blockchain node that is communicatively coupled to the storage system, a plurality of expectations that are to be met before the storage system is to be opened;

identifying at least one expectation among the plurality of expectations that is not met and a reason why the expectation is not met, triggering, via the smart contract on the blockchain node communicatively coupled to the storage system, opening of a door of the storage system based on the reason why the expectation is not met and a consensus algorithm stored in the smart contract; and storing information about the determination as a transaction on a blockchain ledger.

17. The non-transitory computer readable medium of claim 16, wherein the triggering comprises opening, via the blockchain node communicatively coupled to the storage system, a locking mechanism of the door of the storage system via the blockchain node communicatively coupled thereto, in response to a request from the smart contract.

* * * * *